United States Patent
Stark et al.

(10) Patent No.: US 11,652,387 B2
(45) Date of Patent: May 16, 2023

(54) ELECTRIC MOTOR INCLUDING A ROTOR

(71) Applicant: SEW-EURODRIVE GMBH & CO. KG, Bruchsal (DE)

(72) Inventors: Michael Stark, Bad Langenbrücken (DE); Klaus Müller, Karlsruhe (DE); Bernhard Winter, Seeheim-Jugenheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/562,243

(22) Filed: Dec. 27, 2021

(65) Prior Publication Data

US 2022/0123622 A1    Apr. 21, 2022

Related U.S. Application Data (63) Continuation of application No. 16/639,973, filed as application No. PCT/EP2018/025196 on Jul. 16, 2018, now Pat. No. 11,211,843.

(30) Foreign Application Priority Data

Aug. 16, 2017  (DE) .......................... 102017007694.4

(51) Int. Cl.
```
H02K 1/28      (2006.01)
H02K 5/173     (2006.01)
H02K 7/00      (2006.01)
H02K 7/08      (2006.01)
```
(52) U.S. Cl.
CPC ............. *H02K 5/1732* (2013.01); *H02K 1/28* (2013.01); *H02K 7/003* (2013.01); *H02K 7/083* (2013.01); *H02K 2213/12* (2013.01)

(58) Field of Classification Search
CPC ........ H02K 5/1732; H02K 1/28; H02K 7/003; H02K 7/083; H02K 2213/12
USPC ....................................................... 310/40 R
See application file for complete search history.

(56) References Cited

U.S. PATENT DOCUMENTS

| | | |
|---|---|---|
| 2,427,748 A | 9/1947 | Schuck |
| 3,234,419 A | 2/1966 | Picozzi |
| 3,391,291 A | 7/1968 | Benson et al. |
| 6,891,292 B2 | 5/2005 | Raster et al. |
| 6,946,765 B2 | 9/2005 | Rapp et al. |

(Continued)

FOREIGN PATENT DOCUMENTS

| | | |
|---|---|---|
| CH | 27587 A | 1/1901 |
| CN | 1083634 A | 3/1994 |

(Continued)

OTHER PUBLICATIONS

International Preliminary Report on Patentability issued from the International Bureau dated Feb. 27, 2020.

*Primary Examiner* — Terrance L Kenerly
(74) *Attorney, Agent, or Firm* — Carter, DeLuca & Farrell LLP (57) ABSTRACT

An electric motor includes a rotor having a rotor shaft part and a first shaft part and a second shaft part. The rotor shaft is situated axially between the first and the second shaft parts. The first shaft part includes a first bearing seat and is connected to the rotor shaft part in a torsionally fixed manner, and the second shaft part includes a second bearing seat and is connected to the rotor shaft part in a torsionally fixed manner.

23 Claims, 5 Drawing Sheets

(56) References Cited

U.S. PATENT DOCUMENTS

| | | | |
|---|---|---|---|
| 8,975,800 B2 * | 3/2015 | Riedl | H02K 1/30 |
| | | | 310/216.011 |
| 9,800,108 B2 | 10/2017 | Ramdane et al. | |
| 2010/0013351 A1 | 1/2010 | Gas et al. | |
| 2015/0020391 A1 | 1/2015 | Abe et al. | |
| 2018/0062467 A1 | 3/2018 | Barthes et al. | |

FOREIGN PATENT DOCUMENTS

| | | | | |
|---|---|---|---|---|
| CN | 1448004 | A | 10/2003 | |
| CN | 1477758 | A | 2/2004 | |
| CN | 103595211 | * | 2/2014 | H02K 21/02 |
| CN | 104518587 | A | 4/2015 | |
| CN | 205647161 | U | 10/2016 | |
| CN | 212202817 | * | 12/2020 | F16C 3/02 |
| DE | 2548313 | A1 | 5/1977 | |
| DE | 4205322 | A1 | 8/1993 | |
| DE | 4240045 | C1 | 2/1994 | |
| DE | 20307198 | U1 | 9/2003 | |
| DE | 202015003200 | U1 | 5/2015 | |
| GB | 1560746 | A | 2/1980 | |
| JP | 2013074736 | A | 4/2013 | |
| JP | 2014093866 | A | 5/2014 | |

\* cited by examiner

ELECTRIC MOTOR INCLUDING A ROTOR

CROSS-REFERENCE TO RELATED APPLICATIONS

The present application is a continuation of U.S. patent application Ser. No. 16/639,973, which is the national stage of PCT/EP2018/025196, having an international filing date of Jul. 16, 2018, and claims priority to Application No. 102017007694.4, filed in the Federal Republic of Germany on Aug. 16, 2017, each of which is expressly incorporated herein in its entirety by reference thereto.

FIELD OF THE INVENTION

The present invention relates to an electric motor including a rotor.

BACKGROUND INFORMATION

It is conventional for an electric motor to have a rotatably mounted rotor.

SUMMARY

Example embodiments of the present invention provide for an electric motor in many variants to be produced in a cost-effective manner.

According to example embodiments of the present invention, an electric motor includes a rotor having a rotor shaft part and a first shaft part and a second shaft part. The rotor shaft part is axially situated between the first and the second shaft parts. The first shaft part has a first bearing seat and is connected to the rotor shaft part in a torsionally fixed manner, and the second shaft part has a second bearing seat and is connected to the rotor shaft part in a torsionally fixed manner.

This has the advantage that the rotor is made up of a plurality of parts. Thus, a high variety of rotors is able to be produced using a low number of parts. In these variants, the rotor is therefore able to be offered at the axially front end region with different options. For example, the first shaft part may be arranged to be larger or smaller, which means that a pinion having different sizes may be attached. In the same manner, the second shaft part may be arranged to include a connection section for a fan and/or a brake, or it may be provided with or without an extension section.

According to example embodiments, the rotor is mounted via a first bearing in a first bearing shield and via a second bearing in a second bearing shield, the first and the second bearing shields being connected to a stator housing which is situated between the first and the second bearing shields. This has the advantage that the mounting of the rotor is able to be carried out on the two shaft parts and a high transverse moment is therefore derivable. In addition, minimal distortions are applied to the rotor shaft part itself. Moreover, bearings of different sizes may be provided.

According to example embodiments, a first bearing of the rotor is situated on the first bearing seat and a second bearing of the rotor is situated on the second bearing seat. The first bearing is accommodated in the first bearing shield and the second bearing is accommodated in the second bearing shield. This offers the advantage that an uncomplicated production is possible, and because of the tripartite configuration of the housing, i.e. the stator housing part and two end shields, different axially front or rear mechanical interfaces are providable using a small number of parts, resulting in a high variety of motors.

According to example embodiments, a laminated stator core having a stator winding inserted therein is accommodated in the stator housing. This has the advantage that the stator winding is able to be provided as a three-phase winding, which allows a rotary field to be generated. The rotor has a squirrel cage so that the electric motor is an asynchronous motor.

According to example embodiments, the first shaft part has a first journal region, which is pressed into a first recess of the rotor shaft part, and the second shaft part has a second journal region, which is pressed into a second recess of the rotor shaft part. This offers the advantage that a centered, torsion-proof connection of the shaft parts to the rotor shaft part is able to be established.

According to example embodiments, the first journal region has a gear-tooth region, i.e. a region provided with teeth, and a cylindrical region, the gear-tooth region being pressed into a region, provided with internal teeth, of the first recess, in particular under an elastic deformation, and/or the second journal region also has a gear-tooth region, i.e. a region provided with teeth, and a cylindrical region, the gear-tooth region being pressed into a region, provided with internal teeth, of the second recess, in particular under an elastic deformation. This has the advantage of achieving a torque-proof connection which is able to withstand particularly high stresses.

According to example embodiments, the rotor shaft packet is situated on the rotor, and the contact region between the laminated rotor core and the rotor shaft part has an axially smaller extension than the laminated rotor core. This offers the advantage that gaps may be provided axially on both sides, which protect the laminated rotor core from axially introduced distortions, in particular from the area of the connection of the journal regions to the rotor shaft part.

According to example embodiments, a first gap, which is axially adjacent to the contact region, is situated between the laminated rotor core and the rotor shaft part, and/or a second first gap, which is axially adjacent to the contact region, is situated between the laminated rotor core and the rotor shaft part. This has the advantage that the contact region, i.e. the support region, is protected from distortions introduced by connection interfaces, and consequently retains its cylindrical outer contour without change.

According to example embodiments, the journal region of the first shaft part is axially set apart from the contact region, and/or the journal region of the second shaft part is axially set apart from the contact region. This has the advantage that no substantial distortions are transmitted from the journal region to the contact region despite the journal region being pressed into the internal toothing provided on the rotor shaft part and despite the introduction of high forces during this press-in operation.

According to example embodiments, the axial region covered by the journal region of the first shaft part overlaps with the axial region covered by the first gap and/or is set apart from the axial region covered by the contact region, and/or the axial region covered by the journal region of the second shaft part overlaps with the axial region covered by the second gap and/or is set apart from the axial region covered by the contact region. This has the advantage that no harmful distortions, which would cause a deformation of the contact region, reach the contact region.

According to example embodiments, a squirrel cage is accommodated in the laminated rotor core. This offers the advantage that the motor is able to be arranged as an asynchronous motor.

According to example embodiments, the first shaft part has a connection area, which particularly has a feather key groove for the connection to a gear-tooth part, in particular a pinion. This is considered advantageous insofar as the motor may be used for driving a transmission.

According to example embodiments, the second shaft part has a connection area, which particularly has a feather key groove for the connection to a fan wheel and/or a driver. This is considered advantageous insofar as the motor is able to be arranged as a brake motor or a fan motor.

Further features and aspects of example embodiments of the present invention are described in greater detail below with reference to the appended Figures.

DETAILED DESCRIPTION

As illustrated in FIGS. 1 to 4, the motor has a stator housing 1, in which a laminated stator core 2 which accommodates the stator winding is situated. Winding head 5 axially projects on both sides from the axial region covered by laminated stator core 2.

Figure 1:
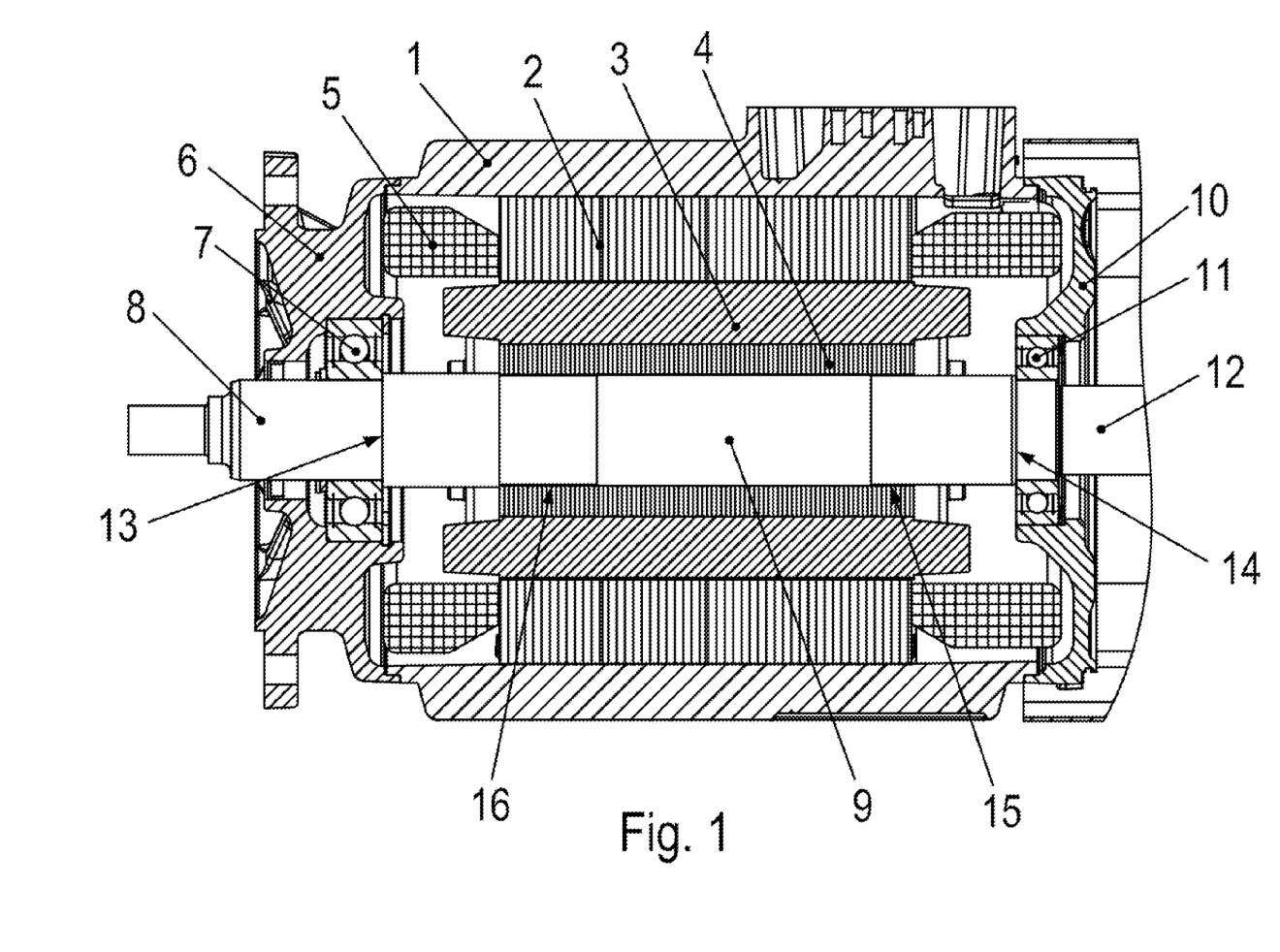
FIG. 1 is a longitudinal cross-sectional view through an electric motor according to an example embodiment of the present invention, the electric motor having a rotor which includes a rotor shaft part 9, a first shaft part 8 and a second shaft part 12.

Stator housing 1 is connected at its first axial end region to a bearing shield 6, which accommodates a first bearing 7 for the mounting of the rotor.

Stator housing 1 is connected at its other axial end region to a bearing shield 10, which accommodates a second bearing 11 for the mounting of the rotor.

Figure 2:
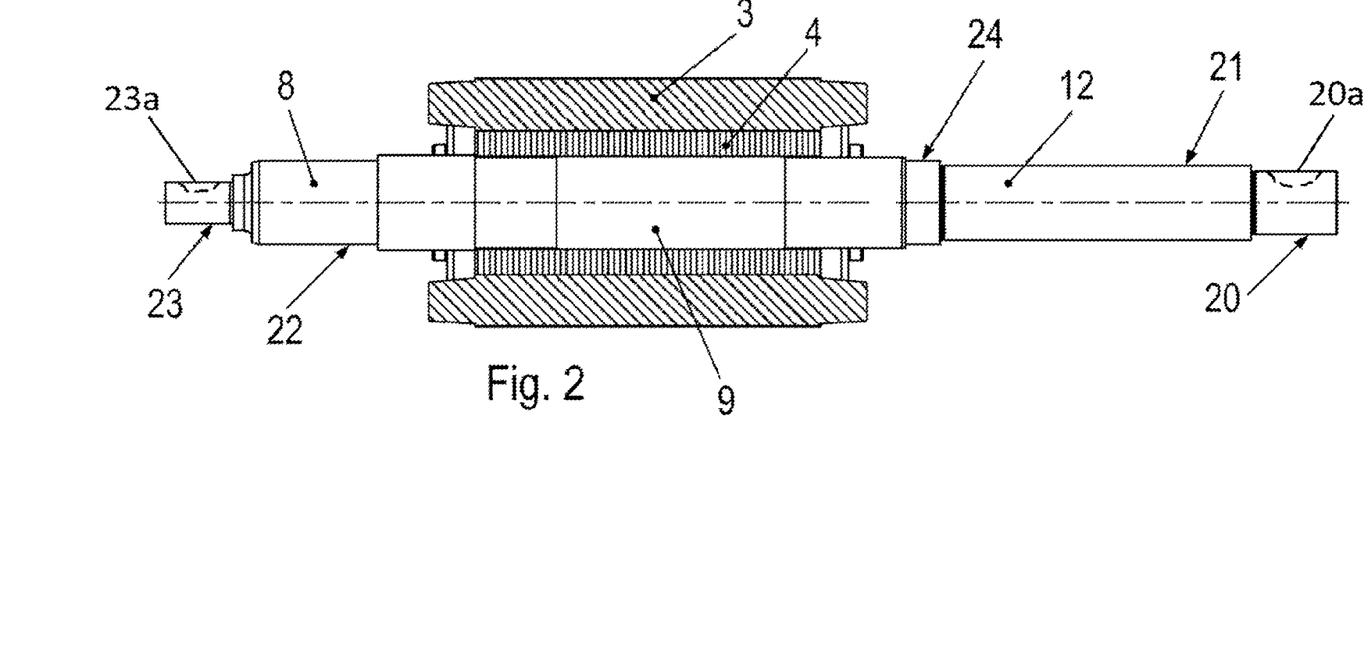
FIG. 2 is a side view of the rotor, in which a laminated rotor core 4 together with a squirrel cage 3 which are situated on rotor shaft part 9 are illustrated in a partial cross-sectional view.

The rotor is formed by a rotor shaft part 9, which has an axially directed stepped bore at its two axial end regions, into which a journal region formed on first shaft part 8 and on second shaft part 12 is inserted in each case.

Figure 4:
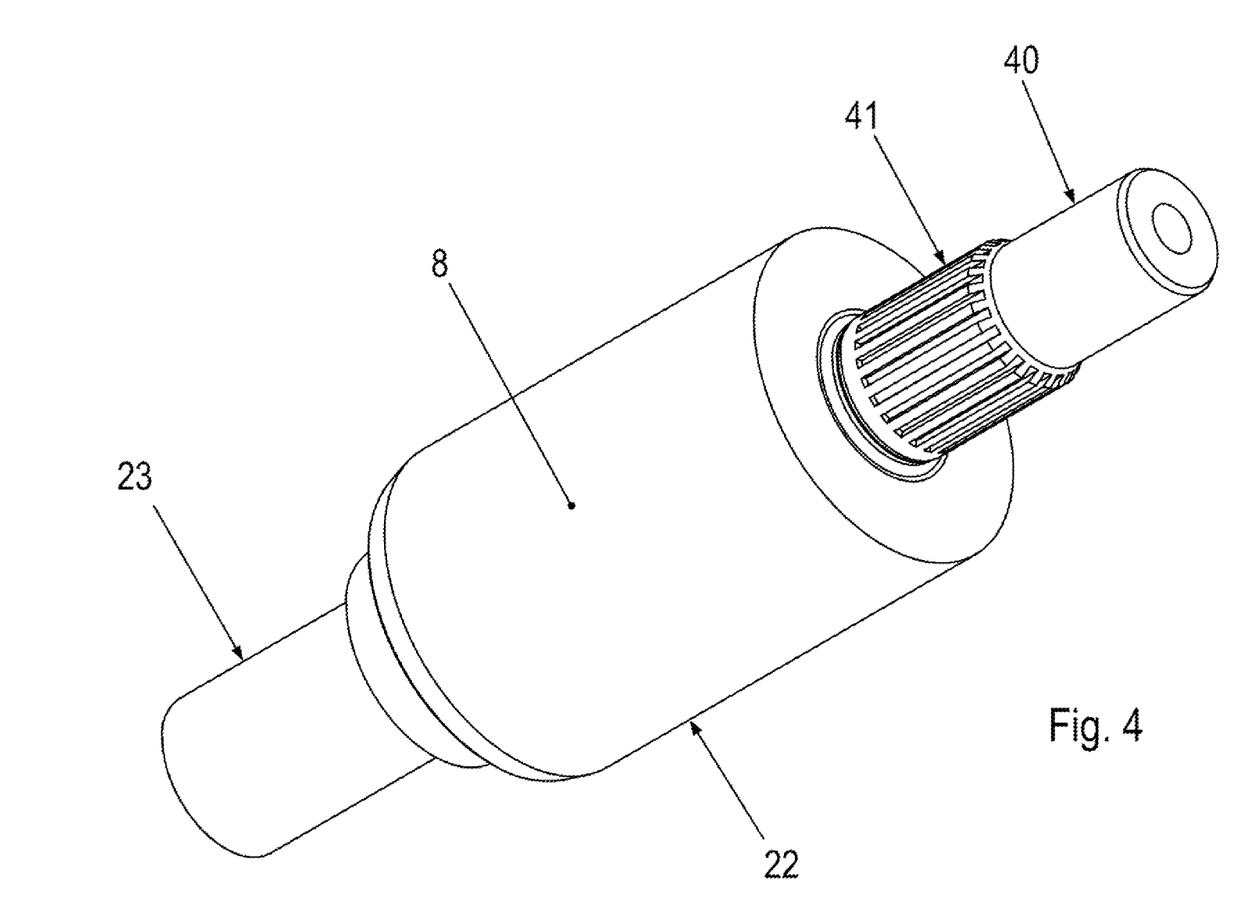
FIG. 4 is a perspective view of a first shaft part 8.

First shaft part 8 has a bearing seat 22 on which first bearing 7 is situated. In addition, the journal region of first shaft part 8 is situated in the axial end region, facing rotor shaft part 9, of first shaft part 8. The journal region is provided with a gear-tooth region 41 and a cylindrical region 40, which is situated between gear-tooth region 41 and bearing seat 22.

Provided in the other axial end region of first shaft part 8 is a connection area 23, which has a feather key groove 23a so that a gear-tooth part, in particular a pinion, is connectable in a torsionally fixed manner to connection area 23 with the aid of the feather key connection.

Figure 3:
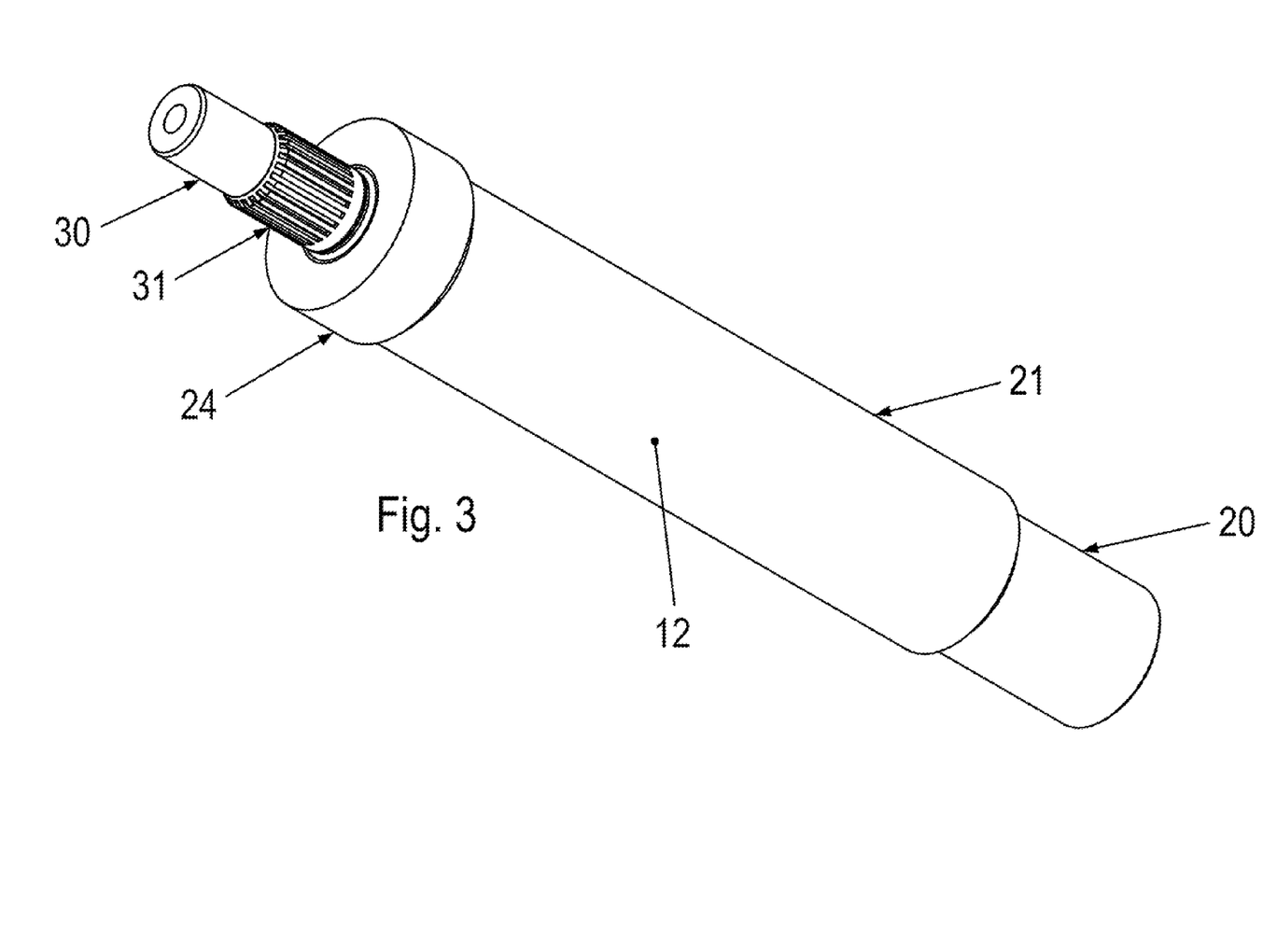
FIG. 3 is a perspective view of a second shaft part 12.

Second shaft part 12 has a bearing seat 24 on which second bearing 11 is disposed. In addition, the journal region of second shaft part 12 is situated in the axial end region, facing rotor shaft part 9, of first shaft part 8. The journal region has a gear-tooth region 31 and a cylindrical region 30 which is disposed between gear-tooth region 31 and bearing seat 24.

Provided in the other axial end region of second shaft part 12 is a connection area 20, which has a feather key groove 20a so that a fan is connectable in a torsion-proof manner to connection area 20 with the aid of the feather key connection. Alternatively or additionally, it is also possible to connect an angle sensor here for the detection of the angular position of the rotor.

A clearance region 21 is situated between bearing seat 24 and connection area 20. It, too, may optionally be provided with a feather key groove so that a gear-tooth part, in particular a driver, is able to be connected to shaft part 12 in a keyed manner. A brake lining support of an electromagnetically actuable brake may be placed on the gear-tooth part, which is disposed in a torsion-proof manner with respect to the rotor but is axially displaceable.

Gear-tooth regions 31 and 41 are able to be arranged as axially formed toothing and/or as knurled regions in each case, i.e. in particular such that the toothing is arranged as knurling.

The respective stepped bore has a cylindrical region in which the respective cylindrical region (30, 40) is accommodated, and a region provided with an internal toothing into which the respective gear-tooth region (31, 41) is pressed. However, this press-in operation results only in an elastic deformation and thus in no chip formation.

The cylindrical region (30, 40) may have a greater axial length than the gear-tooth regions (31, 41). As a result, the respective cylindrical region (30, 40) guides and centers the individual shaft part (8, 12) when the gear-toothed regions (31, 41) are pressed in into the respective region provided with an external toothing.

Bearing seat 24 of second shaft part 12 has a larger diameter than gear-tooth region 31 situated axially adjacent to it. Bearing seat 24 of the second shaft part has a larger diameter than clearance region 21, which is situated on the side of bearing seat 24 that faces axially away from gear-tooth region 31.

Clearance region 21 has a larger diameter than connection area 20.

Bearing seat 22 of first shaft part 8 has a larger diameter than gear-tooth region 41 situated axially adjacent to it. Bearing seat 22 of first shaft part 8 has a larger diameter than connection area 23, which is on the side of bearing seat 22 that faces axially away from gear-tooth region 41.

Laminated rotor core 4 is attached to rotor shaft part 9. However, the area of contact, i.e. the contact region, between laminated rotor core 4 and rotor shaft part 9 has a smaller axial extension than laminated rotor core 4.

This is so because rotor shaft part 9 has a larger diameter in the contact region than in the axially adjoining regions of rotor shaft part 9 on both sides. As a result, a gap (15, 16) is provided in these adjoining regions between laminated rotor core 4 and rotor shaft part 9.

Squirrel cage 3 may be made from aluminum and/or copper. Laminated rotor core 4 may be made up of a stack of individual sheet metal parts, which is formed in an axial direction, the sheet metal parts being produced from sheet steel, for example.

The region axially covered by the respective stepped bore is set apart from the region axially covered by the contact region. As a result, an axial clearance is provided between the stepped bore and the contact region.

However, the region axially covered by the respective stepped bore must not overlap with the axial region covered by the respective adjacent gap (15, 16). In any event, even then an axial clearance between the stepped bore and the contact region of laminated rotor core 4 and rotor shaft part 9 is present, however.

In this manner, stresses that may possibly arise when shaft parts 8 and 12 are joined to rotor shaft part 9 are kept away as much as possible from the contact region where it is important for rotor shaft part 9 to have the most precise cylindrical outer contour possible.

Moreover, in the event that shaft parts 8 and 12 do not align with rotor shaft part 9 with sufficient precision, retroactive working and thus aligning of shaft parts 8 and 12 with respect to rotor shaft part 9 is possible, without the stresses that occur in the process having an interfering effect on laminated rotor core 4 accommodated in the contact region.

Laminated rotor core 4 may be thermally shrunk onto the contact region, i.e. connected in a nonpositive manner.

First shaft part 8 rests against cutting edge 13 of rotor shaft part 9 via the step formed at the base of the journal region.

Second shaft part 12 rests against cutting edge 14 of rotor shaft part 9 via the step formed at the base of the journal region.

Because the rotor is made up of multiple parts, a high variety of rotors is able to be made available using a small number of components.

Figure 5:
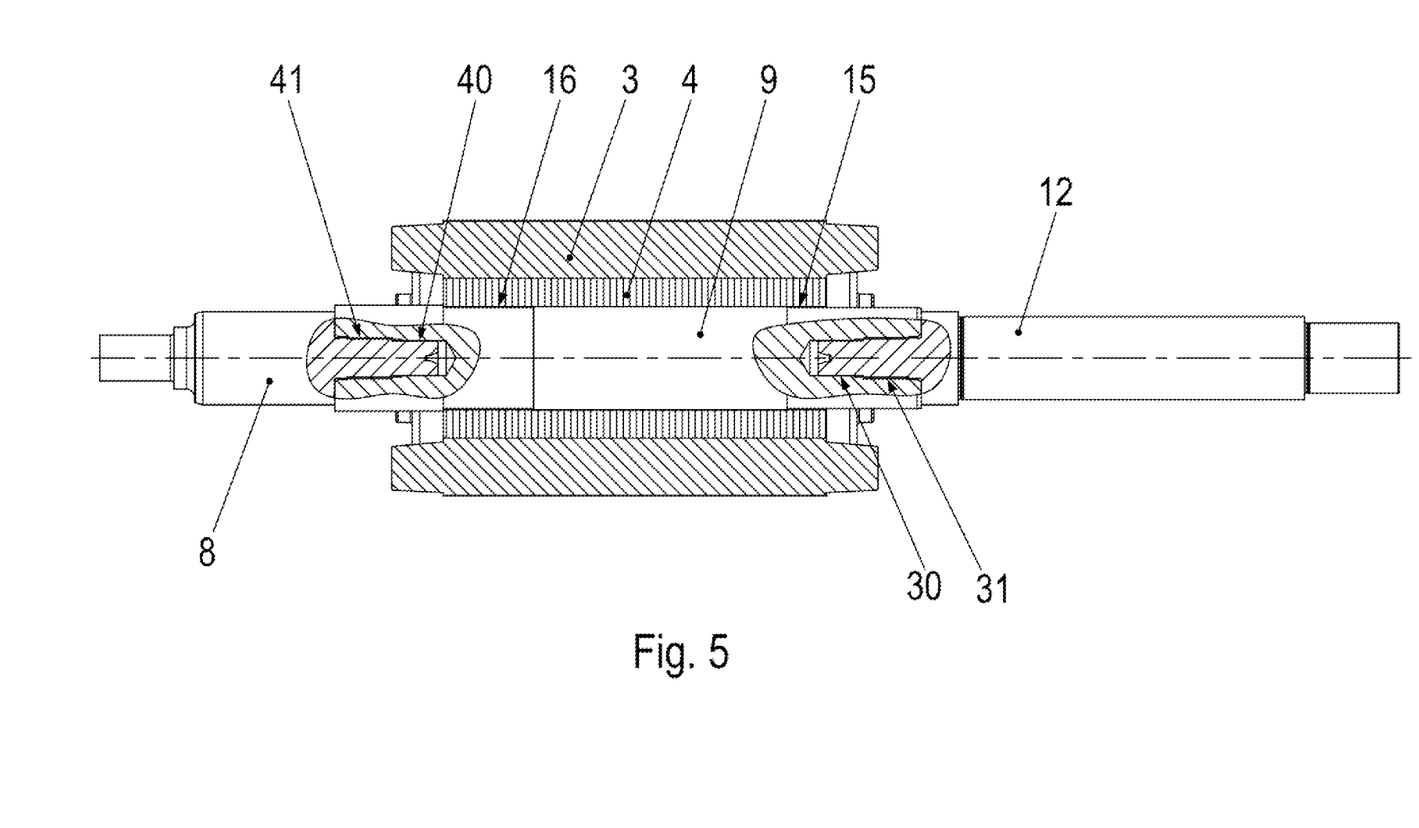
FIG. 5 illustrates the rotor of an exemplary embodiment, which resembles the rotor of the exemplary embodiment illustrated in FIGS. 1 to 4, rotor shaft part 9 being shown in a partial cross-sectional view.

As illustrated by the similar rotor according to FIG. 5, cylindrical region 40 of the journal region of first shaft part 8 and gear-tooth region 41 of the journal region of first shaft part 8 are set apart by a gap 16 in each case, which is axially interposed between cylindrical region 40 and the contact region of laminated stator core 4 and rotor shaft part 9.

In the same manner, cylindrical region 30 of the journal region of second shaft part 12 and gear-tooth region 31 of the journal region of second shaft part 12 are set apart by a gap 15 in each case, which is axially interposed between cylindrical region 30 and the contact region of laminated stator core 4 and rotor shaft part 9.

The contact region thus functions as a support region for laminated rotor core 4.

First shaft part 8 is made of steel. Second shaft part 12 is made of steel. First rotor shaft part 9 is made of steel.

In further exemplary embodiments according to the present invention, the cylindrical regions (30, 40) of the journal regions and/or the gear-tooth regions (31, 41) are additionally provided with a spiral groove. In this manner, the air that is compressed when the journal regions are pressed into the stepped bore is able to escape, which thus makes it easier to ensure the centering during the press-in operation.

LIST OF REFERENCE NUMERALS

1 stator housing
2 laminated stator core
3 squirrel cage
4 laminated rotor core
5 winding head
6 bearing shield
7 bearing
8 first shaft part
9 rotor shaft part
10 bearing shield
11 bearing
12 second shaft part
13 cutting edge
14 cutting edge
15 gap
16 gap
20 connection area
20a feather key groove
21 clearance region
22 bearing seat
23 connection area
23a feather key groove
24 bearing seat
30 cylindrical region of the journal region
31 gear-tooth region of the journal region
40 cylindrical region of the journal region
41 gear-tooth region of the journal region

What is claimed is:

1. An electric motor, comprising:
   a rotor including:
      a rotor shaft part;
      a first shaft part; and
      a second shaft part;
   wherein the rotor shaft part is arranged axially between the first shaft part and the second shaft part;
   wherein the first shaft part has a first bearing seat and is connected to the rotor shaft part in a torsionally fixed manner by (a) an external gear-tooth region of a first one of the first shaft part and the rotor shaft part engaging an internal gear-tooth region of a second one of the first shaft part and the rotor shaft part and/or (b) a press-fit connection between the first shaft part and the rotor shaft part; and
   wherein the second shaft part has a second bearing seat and is connected to the rotor shaft part in a torsionally fixed manner by (a) an external gear-tooth region of a first one of the second shaft part and the rotor shaft part engaging an internal gear-tooth region of a second one of the second shaft part and the rotor shaft part and/or (b) a press-fit connection between the second shaft part and the rotor shaft part.

2. The electric motor according to claim 1, wherein the rotor is mounted via a first bearing in a first bearing shield and via a second bearing in a second bearing shield, the first and the second bearing shields being connected to a stator housing, which is arranged between the first bearing shield and the second bearing shield.

3. The electric motor according to claim 2, wherein a first bearing of the rotor is arranged on the first bearing seat and a second bearing of the rotor is arranged on the second bearing seat, the first bearing being accommodated in the first bearing shield and the second bearing being accommodated in the second bearing shield.

4. The electric motor according to claim 2, wherein a laminated stator core having a stator winding inserted therein is accommodated in the stator housing.

5. The electric motor according to claim 1, wherein the first shaft part has a first journal region pressed into a first recess of the rotor shaft part, and the second shaft part has a second journal region pressed into a second recess of the rotor shaft part.

6. The electric motor according to claim 5, wherein the first journal region has a gear-tooth region and a cylindrical region, the gear-tooth region of the first journal region being pressed into a region, provided with internal teeth, of the first recess, and/or the second journal region has a gear-tooth region and a cylindrical region, the gear-tooth region of the second journal region being pressed into a region, provided with internal teeth, of the second recess.

7. The electric motor according to claim 6, wherein the gear-tooth region of the first journal region is pressed into the region of the first recess under elastic deformation, and/or the gear-tooth region of the second journal region is pressed into the region of the second recess under elastic deformation.

8. The electric motor according to claim 1, wherein a laminated rotor core is provided on the rotor, and a contact region between the laminated rotor core and the rotor shaft part has a smaller axial extension than the laminated rotor core.

9. The electric motor according to claim 8, wherein a first gap, which is axially adjacent to the contact region, is provided between the laminated rotor core and the first shaft part, and/or a second gap, which is axially adjacent to the contact region, is provided between the laminated rotor core and the second shaft part.

10. The electric motor according to claim 8, wherein a journal region of the first shaft part is axially set apart from the contact region, and/or a journal region of the second shaft part is axially set apart from the contact region.

11. The electric motor according to claim 5, wherein a laminated rotor core is provided on the rotor, a contact region between the laminated rotor core and the rotor shaft part having a smaller axial extension than the laminated rotor core; and
wherein the journal region of the first shaft part is axially set apart from the contact region, and/or the journal region of the second shaft part is axially set apart from the contact region.

12. The electric motor according to claim 9, wherein a laminated rotor core is provided on the rotor, a contact region between the laminated rotor core and the rotor shaft part having a smaller axial extension than the laminated rotor core; and
wherein (a) an axial region covered by the journal region of the first shaft part overlaps with an axial region covered by the first gap and/or is set apart from an axial region covered by the contact region, and/or (b) an axial region covered by the journal region of the second shaft part overlaps with an axial region covered by the second gap and/or is set apart from the axial region covered by the contact region.

13. The electric motor according to claim 8, wherein a squirrel cage is accommodated in the laminated rotor core.

14. The electric motor according to claim 1, wherein the first shaft part has a connection area connecting to a gear-tooth part and/or a pinion.

15. The electric motor according to claim 14, wherein the connection area includes a feather key groove.

16. The electric motor according to claim 1, wherein the second shaft part has a connection area connecting to a fan wheel and/or a driver.

17. The electric motor according to claim 16, wherein the connection area includes a feather key groove.

18. The electric motor according to claim 14, wherein the second shaft part has a connection area connecting to a fan wheel and/or a driver.

19. The electric motor according to claim 1, wherein the gear-tooth regions include axially-extending toothings and/or knurlings.

20. The electric motor according to claim 1, wherein the first one of the first shaft part and the rotor shaft part includes a cylindrical region and the external gear-tooth region and the second one of the first shaft part and the rotor shaft part includes a stepped bore having a cylindrical region and the internal gear-tooth region, the internal gear-tooth region of the first one of the first shaft part and the rotor shaft engaging the external gear-tooth region of the second one of the first shaft part and the rotor shaft, the cylindrical region of the first one of the first shaft part and the rotor shaft being press-fit into the cylindrical region of the stepped bore of the second one of the first shaft part and the rotor shaft.

21. The electric motor according to claim 20, wherein the first one of the second shaft part and the rotor shaft part includes a cylindrical region and the external gear-tooth region and the second one of the second shaft part and the rotor shaft part includes a stepped bore having a cylindrical region and the internal gear-tooth region, the internal gear-tooth region of the first one of the second shaft part and the rotor shaft engaging the external gear-tooth region of the second one of the second shaft part and the rotor shaft, the cylindrical region of the first one of the second shaft part and the rotor shaft being press-fit into the cylindrical region of the stepped bore of the second one of the second shaft part and the rotor shaft.

22. An electric motor, comprising:
a rotor including:
a rotor shaft part;
a first shaft part; and
a second shaft part;
wherein the rotor shaft part is arranged axially between the first shaft part and the second shaft part;
wherein the first shaft part has a first bearing seat and is connected to the rotor shaft part in a torsionally fixed manner by an external gear-tooth region of a first one of the first shaft part and the rotor shaft part engaging an internal gear-tooth region of a second one of the first shaft part and the rotor shaft part; and
wherein the second shaft part has a second bearing seat and is connected to the rotor shaft part in a torsionally fixed manner by an external gear-tooth region of a first one of the second shaft part and the rotor shaft part engaging an internal gear-tooth region of a second one of the second shaft part and the rotor shaft part.

23. The electric motor according to claim 22, wherein the first shaft part is connected to the rotor shaft part in a torsionally fixed manner by (a) the external gear-tooth region of the first one of the first shaft part and the rotor shaft part engaging the internal gear-tooth region of the second one of the first shaft part and the rotor shaft part and (b) a press-fit connection between the first shaft part and the rotor shaft part; and
wherein the second shaft part is connected to the rotor shaft part in a torsionally fixed manner by (a) the external gear-tooth region of the first one of the second shaft part and the rotor shaft part engaging the internal gear-tooth region of the second one of the second shaft part and the rotor shaft part and/or (b) a press-fit connection between the second shaft part and the rotor shaft part.

* * * * *